(12) United States Patent
Garcia

(10) Patent No.: US 8,064,728 B2
(45) Date of Patent: Nov. 22, 2011

(54) TRACEABILITY MARKS

(75) Inventor: Jason A. Garcia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1203 days.

(21) Appl. No.: 11/694,893

(22) Filed: Mar. 30, 2007

(65) Prior Publication Data

US 2008/0240614 A1     Oct. 2, 2008

(51) Int. Cl.
 G06K 9/00 (2006.01)
 G06K 9/46 (2006.01)
 G06K 9/36 (2006.01)
 G06K 9/62 (2006.01)
 G06K 9/66 (2006.01)
 G06K 7/10 (2006.01)
 H04N 9/47 (2006.01)
 H04N 7/18 (2006.01)

(52) U.S. Cl. ........ 382/287; 382/103; 382/128; 382/145; 382/153; 382/190; 382/224; 382/276; 348/87; 348/135; 235/462.01

(58) Field of Classification Search .......... 382/100–101, 382/103, 141–153, 181–182, 190, 192–193, 382/199, 201, 203–204, 209, 216–218, 224; 348/86–95, 135–137, 169–172; 235/426.01; 356/123–127, 614–624

See application file for complete search history.

(56) References Cited

U.S. PATENT DOCUMENTS

| | | | |
|---|---|---|---|
| 4,522,656 A | 6/1985 | Kuhn-Kuhnenfeld et al. | 148/1.5 |
| 4,585,931 A | 4/1986 | Duncan et al. | 235/464 |
| 5,175,425 A | 12/1992 | Spratte et al. | 235/494 |
| 5,256,578 A | 10/1993 | Corley et al. | 437/8 |
| 5,506,682 A * | 4/1996 | Pryor | 356/623 |
| 6,337,122 B1 | 1/2002 | Grigg et al. | 428/195 |
| 6,585,927 B2 | 7/2003 | Grigg et al. | 264/401 |
| 7,005,603 B2 | 2/2006 | Addington et al. | 219/121.69 |
| 2002/0017708 A1* | 2/2002 | Takagi et al. | 257/678 |
| 2002/0055082 A1* | 5/2002 | Durbin et al. | 433/29 |
| 2006/0278722 A1 | 12/2006 | Tominaga | 235/492 |

OTHER PUBLICATIONS

Mehrotra and Gary, Similar-Shape Retrieval in Shape Data Management, IEEE 1995.*

* cited by examiner

*Primary Examiner* — Anand Bhatnagar
*Assistant Examiner* — Nathan Bloom
(74) *Attorney, Agent, or Firm* — Konrad Raynes & Victor LLP; Alan S. Raynes

(57) ABSTRACT

The formation of marks on devices is described. In one embodiment, a method for marking a device includes forming a plurality of unique marks sequentially on a device. The method includes defining a virtual array having a plurality of cells extending in an x-direction and a plurality of cells extending in a y-direction, wherein the marks are each positioned in a cell in the virtual array. The method also includes capturing an image including the relative cell position of the marks within the virtual array and converting the relative position of the marks within the virtual array into a set of coordinates including an x value along the x-direction and a y value along the y-direction for each of the marks. The method also includes generating a device identification using a plurality of the x values and the y values. Other embodiments are described and claimed.

17 Claims, 5 Drawing Sheets

TRACEABILITY MARKS

RELATED ART

Integrated circuits may be formed on semiconductor wafers that are formed from materials such as silicon. The semiconductor wafers are processed to form various electronic devices. The wafers may be diced into semiconductor chips, which may be attached to a substrate using a variety of known methods. At least one side of the chip (also referred to as a die) or substrate, is often marked for identification.

Certain marking approaches use pattern matching methods, many of which are used for biometric identification. These methods typically rely on a graphical reference image. When a new image is acquired the system will search the database of reference images and determine if an exact match exists. For example, a conventional two-dimensional matrix mark is a mark placed into a continuous square, having 2-3 mm edges, which may be marked on the die, package substrate, and/or heat spreader. The mark is a standard format and can be decoded using numerous commercially available vision systems. Examples of conventional two-dimensional matrix marks are illustrated in FIGS. 1(A) and 1(B), with FIG. 1(A) illustrating a mark made on a surface using a laser, and FIG. 1(B) illustrating a mark appearance when using ink. It should be noted that the corners of each dark region illustrated in FIG. 1(B) may appear more curved than shown in the figure.

Certain problems may be faced when using marks such as those illustrated in FIGS. 1(A)-1(B). For example, as devices continue to get smaller and smaller, the surface area available for marking may be too small for the conventional mark. Moreover, redundancy, or marking the device more than once, may be difficult or impossible due to area constraints. In addition, considerable computer storage space may be required when a large number of unique graphical marks are used.

BRIEF DESCRIPTION OF THE DRAWINGS

Embodiments are described by way of example, with reference to the accompanying drawings, which are not drawn to scale, wherein:

FIG. 5(B) illustrates the device of FIG. 5(A), including grids projected over the marks, in accordance with certain embodiments; and.

DETAILED DESCRIPTION

Certain embodiments relate to a marking system utilizing multiple unique symbols placed within a continuous or discontinuous area on a device. Embodiments may include methods and devices. Certain methods relate to the formation and interpretation of the marks to generate unique device identification values on a plurality of devices. The marks may be formed on a portion of a device, for example, a semiconductor die or other element of an electronic package. The marks may in certain embodiments take the form of unique symbols, including, for example, ⌐, ⌊, ˆ, ⊥ and >. The marks may be mapped in a sequential manner to establish the relative location of the symbols with respect to each other. This relative positioning of each mark is then converted into a value and grouped with the values for the other marks to form a device identification, which may be in the form of a data string that uniquely identifies each mapped symbol group. In certain embodiments, only the data string is stored after the data string is determined, because storing of the image that is decoded might require significantly more storage capacity.

In certain embodiments, the marks are decoded by converting the captured image into a set of coordinates. Examples of coordinate system methods which may be used to define a decoded string value for a given mark pattern include, but are not limited to, a Cartesian coordinate system and a radial coordinate system. In accordance with certain embodiments, for both Cartesian and radial coordinate system methods, a reference mark element may be defined, as well as a sequence in which the remaining elements will be mapped. The order that the elements are mapped may be standardized so that the elements can be repeatably decoded. Alternative syntaxes and/or decoding methods can also be used if desired to describe the pattern.

Figure 1A:
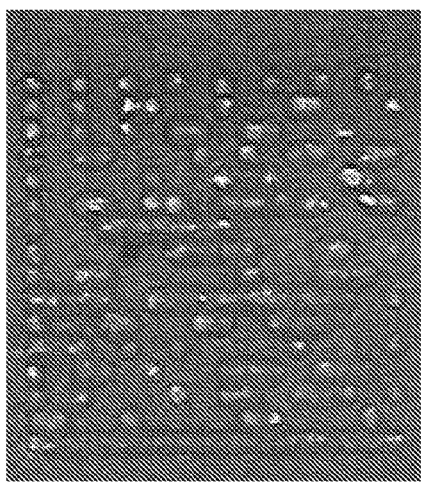
FIGS. 1(A) and 1(B) illustrate examples of two-dimensional matrix marks, including a laser formed mark in FIG. 1(A), and in ink formed mark in FIG. 1(B).
Figure 1B:
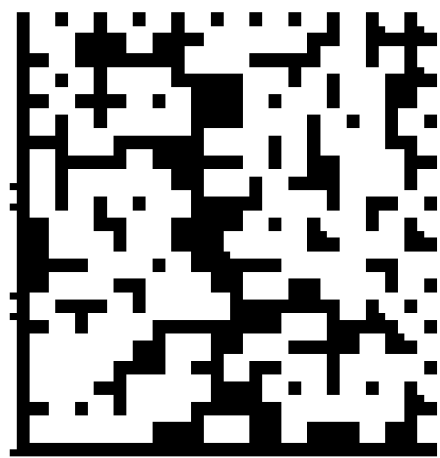
Figure 2A:
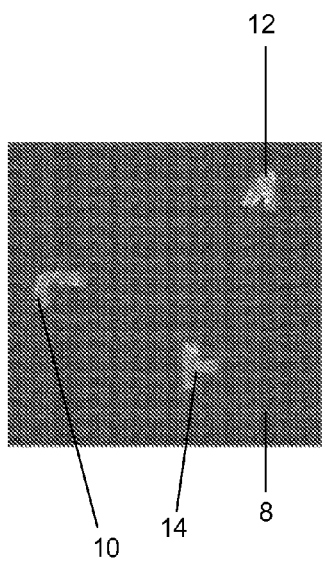
FIGS. 2(A)-2(C) illustrate three unique marks and a method for determining a unique device identification from the marks, using a Cartesian coordinate method, in accordance with certain embodiments.
Figure 2B:
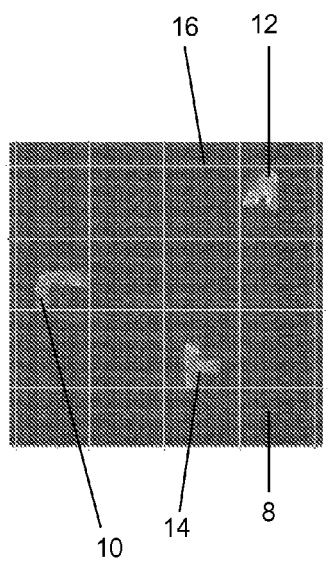
Figure 2C:
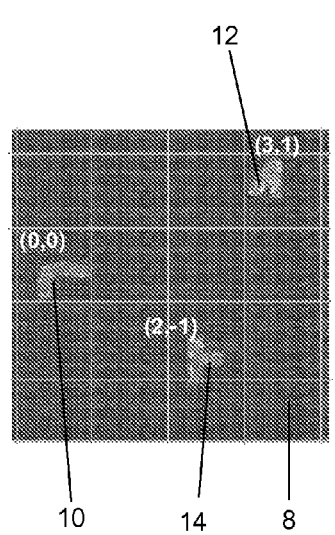

A more specific description of a Cartesian coordinate method in accordance with certain embodiments is described as follows, with reference to FIGS. 2(A)-2(C). As illustrated in FIG. 2(A), marks 10, 12, and 14 are formed on a device region 8. The marks 10, 12, and 14 each have a different shape. As illustrated in FIG. 2(B), a grid 16 is projected over an image of the device region 8 and the marks 10, 12, and 14. After the grid 16 has been overlayed, the coordinate system may be defined as illustrated in FIG. 2(C), with the reference point (0,0) defined as the cell of the grid 16 containing the first mark element, mark 10. Defining the cell location of the first mark as (0,0) allows the center point to vary from unit to unit. The position of the marks 12 and 14 relative to the mark 10 can then be determined by counting in the x and y directions along the cells of the grid 16, as illustrated in FIG. 2(C), which shows mark 10 having Cartesian coordinates (0,0), mark 12 having coordinates (3,1), and mark 14 having coordinates (2,−1). Alternatively, a standardized center point can be established (for example, the top left corner cell, bottom left corner cell, cell closest to the center, etc.), if desired, and then the marks relative positions determined with respect to the standardized center point. Once the coordinate system is established, in one syntax example, a device identification data string can be generated by sequentially appending the x and y coordinate values of each element into a single device identification. In such example, the device identification for the marks as set forth in FIGS. 2(A)-2(C) may be expressed as the x and y values for each of the marks, in the order of mark 10 (0,0), then mark 12 (3,1), then mark 14 (2,−1), with the resultant device identification data string being 00312-1.

In embodiments having a multiple digit maximum x-axis or y-axis value, the identification value should be expressed as a value having the same number of digit places for all coordinate values. For example, if the maximum x or y coordinate value is a triple digit, then any value should be expressed as a triple digit (003, 077, 123, etc.), even if the value is only one digit or two digits, in order to provide consistent decoding values.

Figure 3:
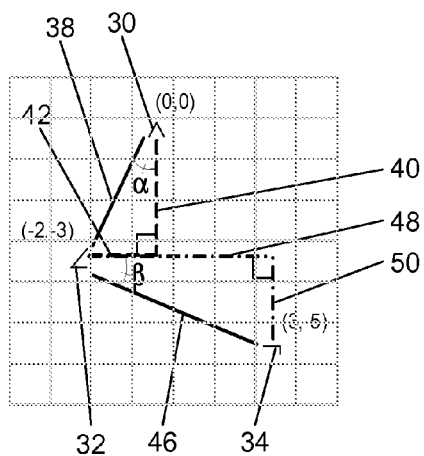
FIG. 3 illustrates three unique marks and a method for determining a unique device identification from the marks, using a radial coordinate method, in accordance with certain embodiments.
Figure 4A:
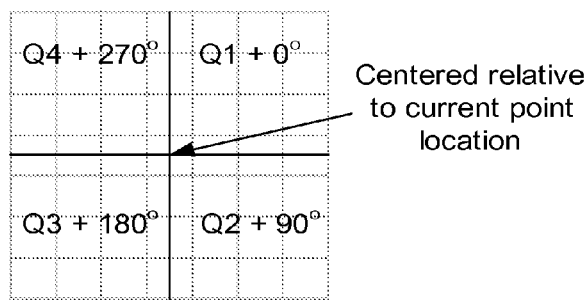
FIGS. 4(A) and 4(B) illustrate quadrant boundaries and offset values for use in a radial coordinate device identification method, in accordance with certain embodiments.
Figure 4B:
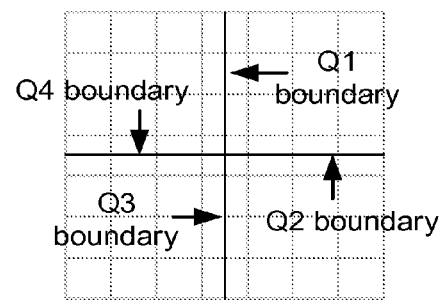

A description of a radial coordinate method in accordance with certain embodiments is described as follows, with reference to FIGS. 3 and 4(A)-4(B). As illustrated in FIG. 3, marks 30, 32, and 34, each have a different shape. The mark 30 has a approximate shape of an arrowhead pointed upwards (^). The mark 32 has an approximate shape of a less than symbol (<). The mark 34 has an approximate shape of a sideways and upside down L. Any unique shape can be used for each mark. A grid 36 is projected over the image of the marks 30, 32, 34.

The coordinate system in this embodiment may be established as follows. As seen in FIG. 3, a reference point (0,0) is defined as the location of the first mark 30. In this embodiment, the location/assignment of the reference point does not impact the decoding naming for device identification. In this embodiment, the device identification is based on a combination of an angle and distance between two sequential marks in the mark pattern. Radial decoding is done by establishing right triangles between two sequential mark elements with the opposite and adjacent sides of the triangle running parallel or perpendicular to the x and y axis. The triangle is also oriented such the adjacent side of the triangle is on a quadrant boundary for consistent decoding. FIGS. 4(A) and 4(B) illustrate the use of quadrants in accordance with certain embodiments, with FIG. 4(B) illustrating the quadrant boundaries, and FIG. 4(A) illustrating the quadrant offset and center location. An angle offset in 90 degree increments, as seen in FIG. 4(A), is used if the angle is in quadrants 2-4.

As seen in FIG. 3, between mark 30 and mark 32, a right triangle with hypotenuse 38, adjacent side 40, and opposite side 42 may be projected onto the grid 36. The angle referenced is with respect to the current element being evaluated in the decoding sequence. The angle and distance between the triangle points can be calculated by using basic geometric functions/equations such as cosine, sine, hypotenuse, and/or Pythagorean. Hypotenuse length is calculated by solving for "c" using $a^2+b^2=c^2$ (Pythagorean theorem), where "a" and "b" are the length of the adjacent and opposite sides of the triangle and "c" is the length of the hypotenuse. Thus, for hypotenuse 38, adjacent side 40, and opposite side 42, the lengths is the square root of the adjacent side length squared plus the opposite side length squared, or the square root of $(3^2+2^2)$, which equals 3.61. The angles can be determined by using standard geometry equations for right triangles, with the sine of the angle $\alpha$ between the hypotenuse 38 and adjacent side 40 being equal to the length of the opposite side 42 divided by the length of the hypotenuse 38, or (2/3.61), which equals 0.55. The angle $\alpha$ can be calculated as the $\sin^{-1}$ 0.55, which equals 33.7 degrees. As indicated in the views of the quadrants in FIGS. 4(A)-4(B), when the first mark 30 is positioned at the center point, the direction of the second mark 34 extends into quadrant 3. As a result, 180 degrees is added to the angle value, for a total angle value of 213.7.

As between mark 32 and 34, a right triangle with hypotenuse 46, adjacent side 48, and opposite side 50 may be projected onto the grid 36. The length of the hypotenuse 46 is the square root of $(5^2+2^2)$, which equals 5.39. The angle $\beta$ can be calculated as the sine of the length of the opposite side 50 over the length of the hypotenuse 46, or (2/5.39), which equals 0.371. The angle $\beta$ can be calculated as the $\sin^{-1}$ 0.371, which equals 21.8 degrees. The direction from the second mark 32 to the third mark 34 extends into the quadrant 2. As a result, 90 degrees is added to the angle value, for a total angle value of 111.8 degrees.

Using as the device identification syntax the angle $\alpha$ and hypotenuse length for the triangle element from using marks 30 and 32, and the angle $\beta$ and the hypotenuse length for the triangle element formed using the marks 32 and 34, a device identification of 213.7_3.61_111.8_5.39 is determined. Decimal accuracy and numerical rounding may be standardized to provide consistent decoding values. For example, the device identification could also be expressed as 213.70003.61111.80005.39 if desired.

Figure 5A:
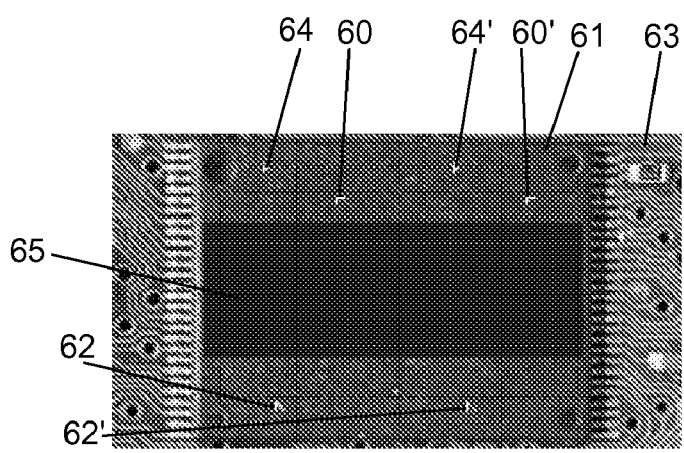
FIG. 5(A) illustrates a device having two sets of marks thereon, including a first set of marks and a second, redundant set of marks, in accordance with certain embodiments.
Figure 5B:
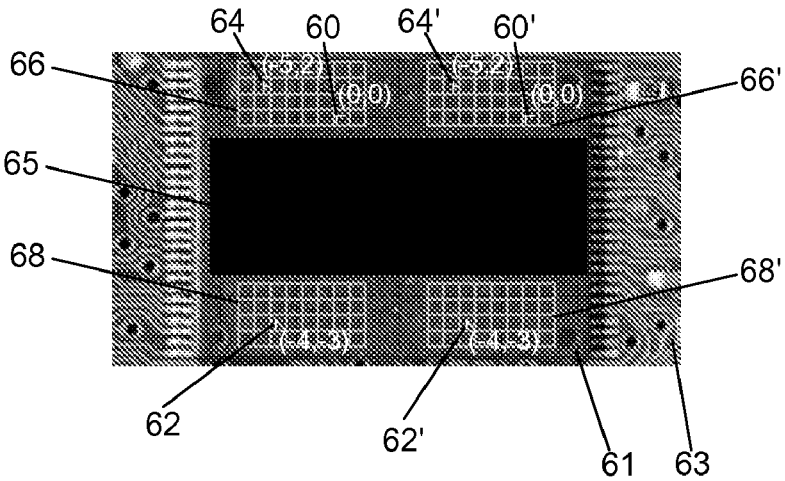
Figure 6:
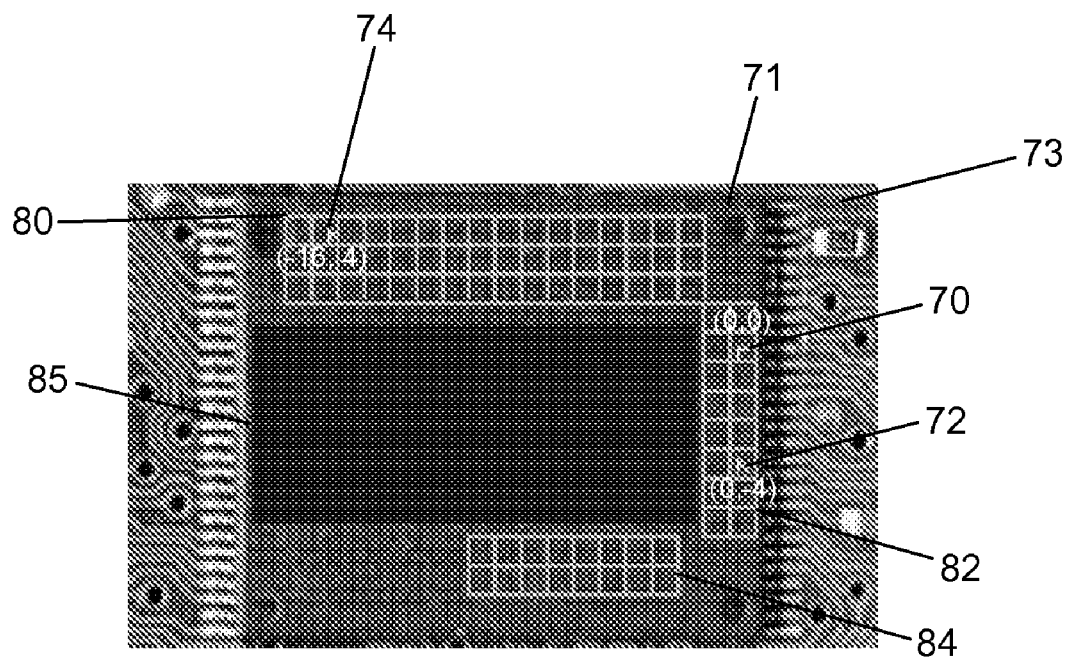
FIG. 6 illustrates a device including an asymmetrical array configuration, in accordance with certain embodiments.

A virtual array formed using a grid projected over part of a device may provide significant flexibility with respect to exclusion zones (areas where marks can not be placed due to, for example, the device structure or other marking requirements), because the grid may be formed in a variety of configurations, including, but not limited to, a continuous array, as in the embodiment illustrated in FIGS. 2(B)-2(C), a discontinuous (split) array, as in the embodiment illustrated in FIGS. 5(A)-5(B), or an asymmetrical array, as in the embodiment illustrated in FIG. 6.

FIG. 5(A) illustrates an embodiment including three marks positioned in a discontinuous or split manner on a device 61 coupled to a substrate 63. Mark 60 and mark 64 are positioned closer to the top of the view, and mark 62 is positioned closer to the bottom of the view. A dark region 65 shows an exclusion zone area between mark 62 and marks 60, 64. FIG. 5(A) also includes redundant marks 60', 62', and 64'. These redundant marks are formed with the same relative positioning as marks 60, 62, and 64.

Redundant marks provide a mechanism to recover when a mismatch between the decoded marks occurs. Redundancy also allows recovery if a portion of the mark can not be detected due to readability issues (foreign material, mark quality, stains, poor element contrast, etc.). To provide redundancy the complete mark pattern or portions of the mark pattern can be repeated multiple times. It is recommended that the virtual arrays of each mark pattern do not overlap. If space limitations require overlapping of the arrays, then the pattern generation logic should preferably provide that only 1 element is placed within a single virtual grid.

Multiple recovery options are available when there is a mismatch between the decoded marks. Some examples of recovery rules when all marks are read and decoded but the decoded values are not 100% matched are as follows: (i) the majority mark is accepted; (ii) the mark is rejected if any mismatches occur; and (iii) the mark is rejected if there is a tie (multiple majority decode values).

Multiple recovery options are also available when a portion of one or more of the decoded marks can not be detected/read, with some examples of recovery rules when one or more of the marks is not 100% read are as follows: (i) the mark is rejected if all marks are not 100% readable; (ii) the decodable portions of the mark are compared to the corresponding decoded values from the other marks; and (iii) the mark is accepted if the readable content matches and a full decoded value is obtained.

For most embodiments, it is recommended that vision systems/methods that are capable of handling diverse conditions such as variable virtual array geometries, multiple array locations, variable focal points, wide field of view, etc., be used. Such suitable systems include the ability to capture and process images such as small electronic packages and the like. Line scan vision systems are recommended. Optical cameras may also be used but are generally more sensitive to changes to the mark variables above. A wide variety of suitable systems are available for capturing and processing the images of the marks.

FIG. 5(B) illustrates the marks of FIG. 5(A), with virtual array grids 66, 66', 68, and 68' projected over the mark regions, using a Cartesian coordinate system. Grid 66 and grid 68 are used in connection with marks 60, 62, and 64. Likewise, grid 66' and grid 68' are used in connection with marks 60', 62', and 64'.

As seen from the grid and values in parentheses in FIG. 5(B), with mark 60 being the first mark used as the zero point along the x-axis and y-axis, mark 62 being the second mark, and mark 64 being the third mark, a device identification of 00-4-32-5 may be determined by counting along the grid line from the mark 60 to the mark 62, and from the mark 60 to the mark 64. Even though grid regions 66 and 68 are separated by the exclusion region 65, the Cartesian coordinate values are readily determined. The same device identification may be found using the redundant marks 60', 62', and 64', using projected grids 66' and 68'.

FIG. 6 illustrates an embodiment having an asymmetrical array configuration, including three marks 70, 72, and 74 on a device 71 coupled to a substrate 73. A region 75 shows an exclusion zone area on the device 71. In the view of FIG. 6, marks 70 and 72 are in grid region 82, positioned to the right of the exclusion zone 75, and mark 74 is in grid region 80, positioned above the exclusion zone 75. As seen from the grids and values in parenthesis in FIG. 6, with mark 70 being the first mark used as the zero point along the x-axis and the y-axis, mark 72 being the second mark, and mark 74 being the third mark, a device identification of 000000-04-1604. As the Cartesian coordinates for mark 74 are (−16, 4), the corresponding values for each mark are each set forth as a two digit number. It should also be noted that the virtual array could also include one or more marks in a grid region 84 positioned below the exclusion zone 75, if desired.

Robust mark placement and virtual array overlay may be controlled to ensure accurate and repeatable mark decoding. It is recommended that in certain embodiments, the placement of the individual mark elements and alignment of the virtual array be based on package features (fiducials, mold imprints, through-hole vias, die edges/corners, surface mount pins, etc.). If package features can not be used then additional features may be incorporated into the mark, specifically to facilitate alignment. If desired, the array cell size can be oversized, with respect to the mark elements, to allow for variation in element placement accuracy and/or to simplify the grid overlay process.

The number of unique decoded mark IDs for symmetrical grid identifications can be expressed by the algorithm set forth in table 1 below:

TABLE 1

Algorithm for determining total number of unique marks from number of unique marks and virtual array grid size.

| Algorithm expression | Explanation of Algorithm steps |
|---|---|
| Current total = 1 | initializes previous total |
| For m = 1 to n | start of loop |
| Current_value = (X − m) | calculates the value for the current element |
| Previous_total = Current value * Current total | multiples the current value and prior values |
| Current_Total = previous total | updates previous total |
| Next m | increment m and restart loop unless m > N, if m > n exit loop |
| Total number of unique marks = Current total | final result | where:
N = n + 1, where N is the actual number of elements marked;
n = N − 1, where n is the number of variable location elements (reference element not included);
X is the total number of virtual array grid cells; and
m is the loop counter Using the algorithm expression in Table 1, in one example, a virtual array with 64 grid cells and 4 physical mark elements resulting would result in 238,266 possible unique mark/identification combinations. This may be calculated as (64−1)* (64−2)*(64−3)=238,266. A virtual array with 64 grid cells and 3 physical mark elements (as in FIGS. 5(A)-5(B), for example) would result in 3,906 possible unique mark/identification combinations. This may be calculated as (64−1)* (64−2)=3906.

Table 2 illustrates a table including the number of unique identifications that can be obtained using various totals of unique marks made and various grid sizes. The columns in Table 2 relating to pixel size assume that each mark is formed from a maximum of 7 pixels. Other pixel sizes, smaller and larger, could also be used. Note that the number of combinations can be increased by increasing the size of the virtual array (grid) while holding the number of marked elements constant. This allows for a higher number of combinations without increasing the physical area of the die that is actually marked. The number of marks within a given mark grid may also be increased to increase the total number of unique identifications. In addition, using multiple standardized symbol sequence combinations within a specific virtual array can have a multiplicative effect on the number of identification values. For example, three groups of three marks, applied at the same time to the device, will yield three times as many unique identification values.

TABLE 2

Number of ID's with various number of marks and grid sizes

| N | X (# cells) | Unique ID's (1 sequence) | approximate mark area (pixels) | approximate virtual array size (pixels) |
|---|---|---|---|---|
| 3 | 64 | 3,906 | 21 | 3,136 |
| 3 | 96 | 8,930 | 21 | 4,704 |
| 3 | 144 | 20,306 | 21 | 7,056 |
| 4 | 90 | 681,384 | 28 | 4,410 |
| 4 | 225 | 11,089,344 | 28 | 11,025 |
| 5 | 64 | 14,295,960 | 35 | 3,136 |
| 5 | 96 | 76,405,080 | 35 | 4,704 |
| 6 | 90 | 4,980,917,040 | 42 | 4,410 |

Use of marks including rectangular, split, and/or asymmetrical virtual arrays in accordance with certain embodiments can offer the ability to utilize space on a device where it is available, instead of requiring a continuous 3×3 mm space for a conventional two-dimensional matrix mark. In certain embodiments, asymmetrical and split arrays also provide the flexibility to distribute the marks across the die only, on the package only, or a combination of both die and package as needed. As result, embodiments may reduce reliability risks by lowering both the required surface area and the mark density.

While certain exemplary embodiments have been described above and shown in the accompanying drawings, it is to be understood that such embodiments are merely illustrative and not restrictive, and that embodiments are not restricted to the specific constructions and arrangements shown and described since modifications may occur to those having ordinary skill in the art.

What is claimed:

1. A method for marking a device, comprising:
    forming a plurality of marks on a device, wherein at least two of the marks are unique from each other;
    defining a virtual array having a plurality of cells extending in an x-direction and a plurality of cells extending in a y-direction, wherein the marks are each positioned in a cell in the virtual array, wherein the virtual array is defined to have a discontinuous configuration, in which the virtual array includes a plurality of grid regions separated from one another by an area of the device having no cells of the virtual array grid regions therein;

capturing an image including the relative cell position of the marks within the virtual array and converting the relative position of the marks within the virtual array into a set of coordinates including an x value along the x-direction and a y value along the y-direction for each of the marks; and generating a device identification using a plurality of the x values and the y values.

2. The method of claim 1, wherein the generating a device identification using a plurality of the x values and the y values includes forming a data string comprising the x value and the y value for each mark.

3. The method of claim 1, wherein the marks generating a device identification using a plurality of the x values and the y values includes forming a data string based on at least one of an angle and a distance between a first mark and a second mark of the plurality of, the first mark being unique in shape from the second mark, the angle and distance being determined by establishing a right triangle between the first mark and the second mark with the a hypotenuse side extending between the first mark and the second mark, an opposite side extending along one of the x-direction and the y-direction, and an adjacent side extending along the other of the x-direction and the y-direction, wherein the distance is the length of the hypotenuse, and the angle is selected from at least one of the angle between the hypotenuse and the opposite side, and the angle between the hypotenuse and the adjacent side.

4. The method of claim 1, further comprising forming the plurality of marks to each be no greater than 7 pixels in size.

5. The method of claim 1, wherein the device includes a semiconductor die, a substrate on which the die is mounted, and wherein the forming a plurality of marks includes forming the marks on the die.

6. The method of claim 1, wherein the marks further include at least a third mark, the third mark having a different shape than the first mark and the second mark, further comprising determining an x value and a y value for the third mark relative to the first mark, and wherein the determining a device identification value also includes using the x value and the y value of the third mark.

7. The method of claim 6, wherein the generating a device identification value using the x-value and the y value includes forming a data string based on a coordinate system selected from the group consisting of a Cartesian coordinate system and a radial coordinate system.

8. The method of claim 6, wherein the determining a device identification value using the x value and the y value comprises:

establishing a first right triangle having a hypotenuse side extending between the first mark and the second mark, an opposite side extending along one of the x-direction and the y-direction, and an adjacent side extending along the other of the x-direction and the y-direction;

determining a length of at least one of the hypotenuse side, the opposite side, and the adjacent side of the right triangle of the first right triangle;

determining an angle of at least one of the angle between the hypotenuse and the opposite side, and the angle between the hypotenuse and the adjacent side of the first right triangle;

establishing a second right triangle having a hypotenuse side extending between the second mark and the third mark, an opposite side extending along one of the x-direction and the y-direction, and an adjacent side extending along the other of the x-direction and the y-direction, wherein one of the adjacent and the opposite sides of the second right triangle is in contact with one of the adjacent and opposite sides of the first right triangle;

determining a length of at least one of the hypotenuse side, the opposite side, and the adjacent side of the right triangle of the second right triangle;

determining an angle of at least one of the angle between the hypotenuse and the opposite side, and the angle between the hypotenuse and the adjacent side of the second right triangle; and forming a data string using a combination of at some of the lengths and angles from the first and second right triangles.

9. A method for marking a device, comprising:

forming a plurality of marks on a device, the marks including a first mark having a different shape than a second mark;

defining a virtual array having a plurality of cells extending in an x-direction and a plurality of cells extending in a y-direction, wherein a plurality of the marks, including the first mark and the second mark, are each positioned in a different cell in the virtual array;

capturing an image including the relative cell position of the marks within the virtual array;

determining an x value and a y value for each of the marks in the virtual array, relative to a reference cell in the virtual array, by counting the number of cells between a selected mark in the virtual array and the reference cell in the x-direction, and the number of cells between the selected mark and the reference cell in the y-direction;

generating a unique device identification using at least the x value and the y value of the marks in the virtual array; and defining the virtual array to have a discontinuous configuration, in which the virtual array includes a plurality of grid regions separated from one another by an area of the device having no cells of the virtual array grid regions therein.

10. The method of claim 9, wherein the plurality of marks positioned in the virtual array includes at least three marks, including the first mark, the second mark, and a third mark, the third mark having a different shape than the first mark and the second mark.

11. The method of claim 9, wherein the generating a device identification using the x value and the y value of the marks in the virtual array includes forming a data string comprising the x value and the y value for each mark in the virtual array.

12. The method of claim 9, wherein the determining a device identification using the x-value and the y value includes forming a data string based on at least one coordinate system selected from the group consisting of a Cartesian coordinate system and a radial coordinate system.

13. The method of claim 12, wherein the data string is based at least in part on a radial coordinate system, and includes data obtained by:

establishing a right triangle having a hypotenuse side extending between the first selected mark and a second selected mark in the virtual array, an opposite side extending along one of the x-direction and the y-direction, and an adjacent side extending along the other of the x-direction and the y-direction;

determining a length of at least one of the hypotenuse side, the opposite side, and the adjacent side of the right triangle of the right triangle; and determining an angle of at least one of the angle between the hypotenuse and the opposite side, and the angle between the hypotenuse and the adjacent side of the first right triangle.

14. The method of claim 9, wherein the generating a unique device identification using at least the x value and the y value of the marks in the virtual array includes forming a right triangle with a hypotenuse extending from a first selected mark to a second selected mark, and using trigonometry to determine parameters of the right triangle, wherein the unique device identification includes a data string comprising at least one of the parameters.

15. The method of claim 9, wherein the forming a plurality of marks on the device includes forming a plurality of two-dimensional marks on the device.

16. The method of claim 9, wherein the device includes a semiconductor die, and wherein the forming a plurality of marks includes forming the marks on the die.

17. The method of claim 9, further comprising defining the virtual array to have an asymmetric configuration of the cells.

* * * * *